United States Patent Office 2,900,370
Patented Aug. 18, 1959

2,900,370

COPOLYMERIZATION OF VINYL ARYL SULFONATES IN THE PRESENCE OF GLYCOLS

William Kenneth Wilkinson, Waynesboro, Va., assignor to E. I. du Pont de Nemours and Company, Wilmington, Del., a corporation of Delaware No Drawing. Application December 3, 1954
Serial No. 473,056

14 Claims. (Cl. 260—79.3)

This invention relates to an improved process for polymerizing water-soluble polymerizable compounds with organic polymerizable compounds. More particularly, it relates to the solubilization of the two types of compounds in media and the polymerization therein.

In the manufacture of addition copolymers, frequently it is desirable for various reasons to copolymerize a water-soluble, organo-inorganic monomer with one or more organic monomers and in which the water-soluble monomer is relatively insoluble. When the polymerization is carried out as a continuous process, the polymerizable materials by necessity have been added to the polymerizer as two separate feed streams. Under such conditions, control of the ratio of the two feed streams is difficult and yet, when only a very small portion of water-soluble monomer is being used to modify the properties of the copolymers produced, very precise control is necessary.

Polymers of acrylonitrile are excellent fiber-forming materials. Yarns, filaments, and fibers of the homopolymer have many desirable properties, but they can be dyed only with great difficulty. Consequently, many copolymers and polymer mixtures have been developed to improve the dyeability of the structures while maintaining the acrylonitrile content at least about 80% based on the weight of the polymer structure. To illustrate one recent trend, a terpolymer consisting of about 94% acrylonitrile, 5% methyl acrylate, and 1% potassium styrenesulfonate was prepared and spun into yarns and fibers. Fabric prepared therefrom exhibited unusually good dyeability not only with basic dyes due to the sulfonate groups introduced, but also with dispersed acetate dyes and with acid dyes when the cuprous ion dyeing technique was used. Obviously, when only 1% of the polymer is potassium styrenesulfonate and this component enhances basic dye affinity, slight variations in composition can markedly alter the dyeability of the polymer with basic dyestuffs. A single stream feed has not been available in the art. Placing the monomers together in a single solution which could be analyzed and maintained constant in its make-up would materially aid in controlling the proportions of each in the polymer, for a uniform solution could be fed to the polymerizer as a single stream of the several monomers.

Therefore, it is an object of this invention to provide solutions of water-soluble, polymerizable monomers in organic polymerizable monomers in which the water-soluble monomers are normally insoluble. A further object is the provision of a method of copolymerizing monomers insoluble in each other to produce uniform polymers. Another object of this invention is to provide a method for solubilizing potassium styrenesulfonate in acrylonitrile or in a mixture of water-insoluble polymerizable monomers predominantly acrylonitrile. Other objects will be apparent from the description that follows.

The objects of this invention are accomplished by forming a single-phase blend of an organic-inorganic, water-soluble monomer, a glycol and an organic monomer, as, for example, by dissolving an unsubstituted ethylene or propylene glycol in the organic monomer or monomer mixture in sufficient quantity to render the solution a solvent for the organo-inorganic, water-soluble monomer to be incorporated therein and then adding thereto the desired quantity of the water-soluble monomer. The materials can be added to a vessel simultaneously or in any sequence. The order of addition of the glycol and the two types of monomers is immaterial, and the means for mixing them is unimportant, conventional vessels and apparatus, such as stirrers, being suitable. As will be apparent from the data that follows, the preferred glycol is a mixture of polyethylene glycols identified as polyethylene glycol-200, referred to herein as PEG-200, i.e., the average molecular weight is about 200. However, ethylene glycol and di- and polyethylene glycols up to a molecular weight of about 400 are also quite effective while other polyethylene glycols and propylene glycols are useful to a lesser degree. The glycols can be in liquid or solid form, and generally are usable as obtained from commercial sources.

The amount of glycol that must be added to the water-insoluble monomer or monomer mixture will depend upon the specific glycol, the specific monomer or monomer mixture, the amount of water-soluble monomer to be incorporated, etc. With PEG-200 the addition may vary from 1% up to 50% or more or less based on the total weight of the monomers. Generally, concentrations of PEG-200 on the total weight of the monomers will be within the range from about 2% up to about 20%, but this is dependent to a large extent on the purity of the water-soluble monomer. For instance, in the case of crude potassium styrenesulfonate containing only about 10% potassium styrene sulfonate, about 12% inorganic salts and the balance water, as much as 40% PEG-200 based on the total monomer weight may be needed. Water is not a solvating agent and additional glycol is usually required to solvate the water as well as the potassium styrenesulfonate. In the case of high quality potassium styrenesulfonate, 2% PEG-200 based on the total monomer weight is sufficient to dissolve 1% potassium styrenesulfonate in an acrylonitrile monomer mixture. With the other glycols, much larger quantities are necessary, but when the proportion of water-soluble monomer to be used is small, they may be used effectively.

The following examples are given to further illustrate and explain the invention without intention of limitation thereby. Percentages given are by weight based on the total weight of the monomers.

EXAMPLE I

The compounds listed in Table 1 below were tested for their effectiveness in solubilizing solid potassium styrenesulfonate into an acrylonitrile/methyl acrylate (95/5) monomer mixture. Ten percent of each of the compounds listed was added to the 95/5 acrylonitrile/methyl acrylate monomer mixture and to the solution formed was added an excess of solid potassium styrenesulfonate with agitation for determination of its solubilization therein. The solubility results are listed in Table 1 below:

Table 1

COMPOUNDS TESTED FOR SOLUBILIZING SOLID POTASSIUM STYRENESULFONATE INTO ACRYLONITRILE-METHYL ACRYLATE (95/5) MIXTURES

| Compounds added: | Percent of sulfonate dissolved |
|---|---|
| None | Less than 0.1 |
| Ethylene glycol | 1.5 |
| Polyethylene glycol 200 (PEG–200) | 5.0 |
| Polyethylene glycol 400 | 2.0 |
| Polyethylene glycol 425 | 0.8 |
| "Carbowax" compound 1000 (polyethylene glycol of about 1000 M.W.) | 0.9 |
| "Carbowax" compound 6000 (polyethylene glycol of about 6000–7500 M.W.) | 0.7 |
| Polypropylene glycol 150 | 0.5 |
| Dipropylene glycol | 0.5 |
| Ethoxytriglycol | 0.7 |
| Hexanetriol 1,2,6 | Less than 0.1 |
| 2-ethylhexanediol 1,3 | Less than 0.1 |
| Isopropyl "Cellosolve" | Less than 0.1 |
| 2-ethylbutyl "Cellosolve" | Less than 0.1 |
| Glycerine | Less than 0.1 |
| Acetin | Less than 0.1 |
| Octylene glycol | Less than 0.1 |
| Methanol | Less than 0.1 |
| Ethanol | Less than 0.1 |
| Isopropanol | Less than 0.1 |
| t-Butanol | Less than 0.1 |
| n-Butanol | Less than 0.1 |
| Cyclohexanol | Less than 0.1 |
| Triglycol dichloride | Less than 0.1 |
| Dioxane | Less than 0.1 |
| Tetrahydrofuran | Less than 0.1 |
| Methylmorpholine | Less than 0.1 |
| Maleic acid | Less than 0.1 |
| d-Tartaric acid | Less than 0.1 |
| Butyrolactone | Less than 0.1 |
| 2-ethylhexanediol 1,3 | Less than 0.1 |
| Triacetin | Less than 0.1 |
| Ethyl cyanoacetate | Less than 0.1 |
| Methyl acetoacetate | Less than 0.1 |
| Methyl benzoate | Less than 0.1 |
| Ethyl lactate | Less than 0.1 |
| Ethyl chloroacetate | Less than 0.1 |
| Acetone | Less than 0.1 |
| Methyl-n-propyl ketone | Less than 0.1 |
| Catechol | Less than 0.1 |
| Dimethylformamide | Less than 0.1 |
| 2-(beta-hydroxyethyl)-pyridine | Less than 0.1 |
| 65% aqueous calcium thiocyanate | Less than 0.1 |
| Lithium bromide | Less than 0.1 |
| Carbon tetrachloride | Less than 0.1 |
| Chloroform | Less than 0.1 |
| Trichloroethylene | Less than 0.1 |
| Alpha-methylbenzyldiethanolamine | Less than 0.1 |
| N-(beta-hydroxypropyl-o-toluidine) | Less than 0.1 |
| Lutidine 2,6 | Less than 0.1 |

From these data, it is at once apparent that PEG–200 is outstanding. This material corresponds closely to tetraethylene glycol but is believed to be a mixture of polyethylene glycols containing in addition to tetraethylene glycol some triethylene glycol and perhaps minor amounts of diethylene glycol, pentaethylene glycol and/or higher polyethylene glycols. While the separate constituents of PEG–200 are operable, it is preferred to use PEG–200 which is readily available. It is also to be noted that ethylene glycol and the polyethylene glycols up to a molecular weight of 6,000 were effective to a lesser extent as were polypropylene glycol 150 and dipropylene glycol.

EXAMPLE II

In order to determine if the addition of polyethylene glycol to other organic monomers was effective in dissolving water-soluble monomers such as potassium styrenesulfonate, a number of tests were made using the monomers listed in Table 2 below. In each case 10% PEG–200, based on the monomer weight, was added to the monomer, and an excess of potassium styrenesulfonate was stirred into the monomer at room temperature and the quantity dissolved therein determined at the end of 0.5 hour. Also, solubility of potassium styrenesulfonate in the pure monomer was tested, i.e., without the addition of the glycol in the same manner. The results of these tests are set forth in Table 2.

Table 2

SOLUBILIZATION OF POTASSIUM STYRENESULFONATE INTO MONOMERS BY POLYETHYLENE GLYCOL–200

| Monomer | Percent Sulfonate Dissolved by Monomer Alone | Percent Sulfonate Dissolved Using PEG–200 |
|---|---|---|
| Methyl acrylate | less than 0.1 | 0.9 |
| 2-vinylpyridine | do | 0.9 |
| Vinyl acetate | do | 0.3 |
| Styrene | 0.2 | 0.6 |
| Methyl isopropenyl ketone | less than 0.1 | 0.4 |
| Methyl vinyl sulfone | 0.4 | 1.4 |
| Methallyl amine | 0.1 | 0.4 |
| Ethyleneglycol dimethacrylate | 0.1 | 0.5 |
| Vinyl salicylate | 0.2 | 0.7 |
| Vinyl quinoline | 0.1 | 0.7 |
| Acrylonitrile | less than 0.1 | 5.0 |

It will be noted that in every case tested the solubility of potassium styrenesulfonate in the water-insoluble monomer was very substantially increased by the addition of 10% PEG–200 to the water-insoluble monomer, in every case at least three-fold, in many cases at least four-fold and in several cases at least nine-fold. Furthermore, the unsaturated polymerizable compounds selected for testing were varied in nature and included vinyls, acrylics, allyls, fatty acid esters, aromatic compounds, amines, nitriles, ketones and sulfones. The compositions resulting from the use of PEG–200 could be readily and smoothly polymerized to uniform polymers.

EXAMPLE III

To determine if other water-soluble monomers would be similarly solubilized in an organic monomer by the addition of a polyethylene glycol to the organic monomer, a series of tests were made with different water-soluble monomers. Acrylonitrile was selected as a representative organic monomer and the solubilities of the water-soluble monomers were tested therein as earlier described without the PEG–200 addition and with the addition of 10% PEG–200 based on the monomer weight. The results are set forth in Table 3.

Table 3

SOLUBILIZATION OF WATER-SOLUBLE MONOMERS INTO ACRYLONITRILE (AN) BY POLYETHYLENE GLYCOL–200

| Monomeric Salts | Solubility in AN | Solubility in AN plus 10% PEG–200, percent |
|---|---|---|
| Potassium Styrene-sulfonate | less than 0.1% | 5.0 |
| Sodium methallyl-sulfonate | 0.2 | 1.7 |
| Potassium acrylate | 0.9 | 6.5 |

As before, the solubility of potassium styrenesulfonate was increased fifty-fold, while the solubility of sodium methallylsulfonate and potassium acrylate was increased over eight-fold and over seven-fold respectively.

In the above examples, potassium styrenesulfonate has been used for exemplification. Many other inorganic-organic monomers could be substituted for it with similar results. Such other monomers include ammonium methallyl sulfonic acid, potassium methallyl sulfonic acid, sodium acrylate, ammonium acrylate, ammonium styrenesulfonate, potassium methacrylate and amine salts of such acidic, ethylenically unsaturated monomers, as, for example, amine salts formed using methyl or butyl amines, or, instead of alkyl amines, aryl amines such as aniline or benzyl amine. Salts with hydroxylated amines, such as ethanolamine, are also operable.

By this invention it is possible to produce single-phase blends or solutions of ethylenically unsaturated monomers that are incompatible with each other. Such monomers exemplified by inorganic-organic, water-insoluble compounds on the one hand and of organic monomers as the other, can be solubilized in each other by the use of the agents of this invention and the resultant compositions can be polymerized by the usual addition polymerizations and techniques to produce uniform polymers.

It is thus possible to prepare a homogeneous solution of relatively water-insoluble, organic addition polymerizable compounds and water-soluble addition polymerizable compounds which normally are mutually insoluble and thus provide a simpler and more readily controllable method of maintaining the desired proportions of ingredients in the polymer prepared therefrom. The various monomers in the mixture may be varied widely but generally only a small proportion of one or more water-soluble monomers is contemplated, such as, for example, from about 0.1% up to about 10% based on the total weight of monomers. Preferred monomer mixtures will comprise 85% to 99% acrylonitrile, 0% to 12% of another water-insoluble monomer such as methyl acrylate, vinyl acetate, methyl vinyl sulfone, methallyl amine, or styrene and from 0.1% to 5% of potassium styrenesulfonate. PEG-200 or tetraethylene glycol are by far the preferred glycols, for aiding in the solution of potassium styrenesulfonate or other water-soluble monomers in the organic monomers mixture and the amount used will not be substantially more than is needed to effect the degree of solubility called for by the proposed composition of the mixture. For many desirable compositions about 2 to 10% PEG-200 based on the total weight of monomer will be found adequate. When less than 1% potassium styrenesulfonate or other water-soluble monomer is to be incorporated in the water-insoluble monomer mixture, one of the other ethylene glycols or propylene glycols may be used as the dissolving agent, if desired.

Any departure from the above description which conforms to the present invention is intended to be included within the scope of the claims.

I claim:

1. A homogeneous single-phase monomer blend comprising at least about 85% acrylonitrile, up to about 5% of a water-soluble salt of a vinyl arene sulfonic acid, and, as a solubilizing agent therefor, a glycol having a molecular weight less than about 7500, said blend being one which forms two phases in the absence of the said glycol.

2. A homogeneous single-phase monomer blend comprising (1) at least 85% of acrylonitrile; (2) up to 5% of a water-soluble salt of a vinyl arene sulfonic acid, (3) up to 12% of an ethylenically unsaturated relatively water-insoluble monomer; and a solubilizing agent comprising a glycol, the said water-soluble salt being soluble in the blend at least to the extent of 0.5%, said blend being one which forms two phases in the absence of the said glycol.

3. The blend of claim 2 which contains about 94% of acrylonitrile; a total of 6% of methyl acrylate and potassium styrene sulfonate; and from about 1% to 50% of a glycol for solubilizing the potassium styrene sulfonate to the extent of at least 0.5% in the monomer mixture, the percentage of glycol being based on the total weight of the monomers.

4. The blend of claim 1 in which the glycol is polyethylene glycol having a molecular weight of about 200.

5. The blend of claim 1 in which the glycol is an ethylene glycol having a molecular weight up to about 425.

6. In a process of preparing polymers from a water-soluble salt of a vinyl arene sulfonic acid and acrylonitrile in which the said salt is insoluble, the improvement which comprises mixing the monomers in the presence of a glycol to produce a single-phase blend in which the said salt is soluble to the extent of at least 0.5% and then subjecting the monomeric blend to polymerization, said blend being one which forms two phases in the absence of the said glycol.

7. The process of claim 6 in which from about 1% to 50% of the said glycol is present based on the total weight of the said monomers.

8. The process of claim 6 in which the water-soluble salt is a sulfonate.

9. The process of claim 8 in which the sulfonate is potassium styrene sufonate.

10. The process of claim 6 in which the weight of the said monomers is made up from about 85% to 99% acrylonitrile, from 0% to 12% of an ethylenically unsaturated relatively water-insoluble monomer and from about 0.1% to 5% of the said water-soluble salt of the ethylenically unsaturated acid.

11. The process of claim 10 in which the water-soluble salt is a sulfonate.

12. The process of claim 10 in which the said water-soluble salt is potassium styrene sulfonate.

13. The process of claim 6 in which the glycol is a polyethylene glycol having a molecular weight of about 200.

14. The process of claim 6 in which the glycol is an ethylene glycol having a molecular weight up to 425.

References Cited in the file of this patent

UNITED STATES PATENTS 2,595,779     Dudley _____ May 6, 1952

OTHER REFERENCES

Wiley: J. Am. Chem. Soc. 76, 720–723 (Feb. 5, 1954). (Copy in Library.)

Classtone: "Textbook of Physical Chemistry," 2nd ed., pp. 729–730, Van Nostrand (1946). (Copy in Library.)

UNITED STATES PATENT OFFICE
CERTIFICATE OF CORRECTION

August 18, 1959

Patent No. 2,900,370

William Kenneth Wilkinson

It is hereby certified that error appears in the printed specification of the above numbered patent requiring correction and that the said Letters Patent should read as corrected below.

Column 3, line 44, for "2-ethylhexanediol 1,3" read -- 2-ethylhexylacetate --.

Signed and sealed this 12th day of April 1960.

(SEAL)
Attest:

KARL H. AXLINE
Attesting Officer

ROBERT C. WATSON
Commissioner of Patents